Nov. 22, 1966           M. G. WILSON           3,287,570

PEAK DETECTING CIRCUIT

Filed Jan. 28, 1963           2 Sheets-Sheet 1

INVENTOR
MELVIN G. WILSON

BY *Donald F Voss*

ATTORNEY

Nov. 22, 1966 M. G. WILSON 3,287,570
PEAK DETECTING CIRCUIT
Filed Jan. 28, 1963 2 Sheets-Sheet 2

United States Patent Office 3,287,570
Patented Nov. 22, 1966

3,287,570
PEAK DETECTING CIRCUIT
Melvin G. Wilson, Rochester, Minn., assignor to International Business Machines Corporation, New York, N.Y., a corporation of New York
Filed Jan. 28, 1963, Ser. No. 254,054
12 Claims. (Cl. 307—88.5)

This invention relates to a peak detecting circuit and more particularly to a circuit for determining with a high degree of accuracy, the time at which a negative or positive maximum level of an electrical voltage signal has been reached.

This invention is concerned with the time at which a maximum level of an electrical voltage signal has occurred and not the magnitude thereof. Although the prior art does contain peak detecting circuits for indicating the time at which a maximum level of an electrical voltage signal occurs, these circuits have the fallibility of detecting leveling-out portions of a signal as peaks or maximums. This invention is not susceptible of detecting leveling-out portions of a signal as peaks.

This invention is widely useful in electronic data processing apparatus and finds particular utility in character recognition apparatus for indicating the first encounter of a character by the scanner.

Accordingly, a prime object of the invention is to provide an improved peak detecting circuit which detects the time at which a maximum level of an electrical voltage signal occurs.

Another very important object of the invention is to provide a peak detecting circuit for indicating the time when a maximum level of an electrical voltage signal occurs which does not detect leveling-out portions of the signal as a maximum level or peak.

Still another very important object of the invention is to provide a peak detecting circuit which has little susceptibility to noise.

The foregoing and other objects, features and advantages of the invention will be apparent from the following more particular description of preferred embodiments of the invention, as illustrated in the accompanying drawings.

Figure 1:
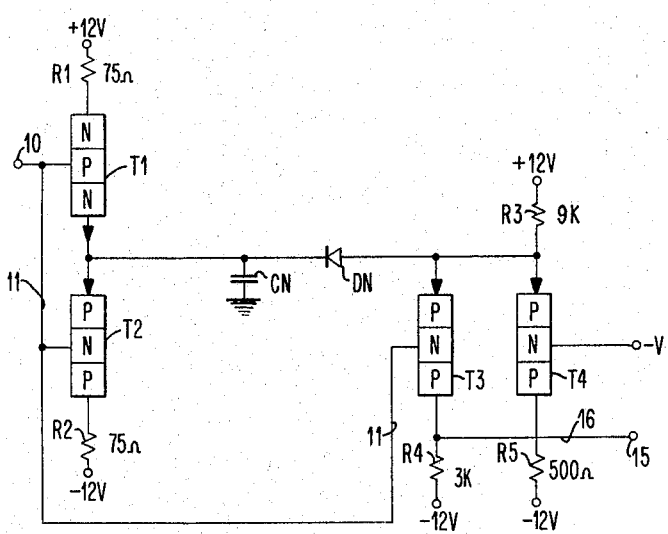
FIG. 1 is a schematic circuit diagram of the invention embodied to detect negative peaks.

The invention as illustrated by way of example in FIG. 1 as an electrical circuit having an input terminal 10 connected by conductor 11 to the base connections of transistors T1, T2 and T3. Transistors T1 and T2 are connected in a complementary emitter follower configuration. The collector of transistor T1 is connected to a positive potential of approximately 12 volts through a resistor R1 having a value of approximately 75 ohms. Transistor T1 is an NPN transistor. Transistor T2 is a PNP transistor and has its collector connected to a negative electrical potential of approximately 12 volts, through a resistor R2 having a value of approximately 75 ohms. The emitters of transistors T1 and T2 are commonly connected to a capacitor CN and to the cathode of a diode DN. The capacitor CN having a value of approximately .47 mf. is also connected to ground. The value of capacitor CN generally depends upon the rise time and frequency characteristics of the input signal. The function of transistors T1 and T2 is to charge capacitor CN to a voltage which is very close to the input signal voltage curve A, FIG. 2, at all times. However, there is a slight difference between the voltage to which the capacitor CN is charged and that of the input signal due to the base-emitter voltage drops of transistors T1 and T2, see FIG. 3.

Figure 3:
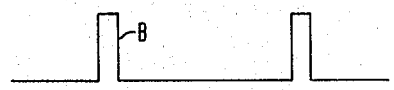
FIG. 3 is a schematic diagram illustrating the relationship between the input voltage signal and the voltage of the capacitor of the circuit shown in FIG. 1.
Figure 3:
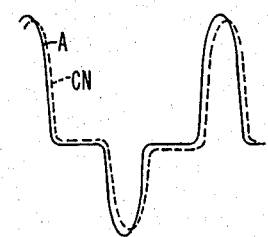

Generally speaking, when the voltage signal applied to terminal 10 is increasing, the capacitor CN is being charged through transistor T1, and its voltage is less than the input signal voltage by the amount equal to the base-emitter voltage drop of transistor T1. At this time, transistor T2 is essentially cut off or non-conducting. When the input voltage signal applied to terminal 10 is decreasing, the capacitor CN is being discharged through transistor T2. As the capacitor CN is being discharged, its voltage is more positive than the input signal voltage by the base-emitter voltage differential of transistor T2. Transistor T1 is essentially cut off during this time. The relationship between the input voltage signal and the voltage of the capacitor CN is shown in FIG. 3.

As it will be seen shortly, neither the cutoff of transistor T1 nor transistor T2, is used to indicate the occurrence of a peak. The reason for not using the cutoff of transistor T1 or T2 as an indication of a peak is that such an arrangement would detect leveling off points such as points L and M, FIG. 2, as peaks. This is because as soon as the signal levels off, the capacitor CN is not charging or discharging and therefore transistor T1 would stop conducting and this would then provide an indication of a peak when in fact, the peak of the voltage signal had not occurred.

It should be particularly noted that the capacitor CN is not being charged through transistor T3. The emitter of transistor T3 is connected to the anode of diode DN and to a positive potential of approximately 12 volts, through a resistor R3 having a value of approximately 9K ohms. An output terminal 15 is connected to the collector of transistor T3 by a conductor 16. The collector of transistor T3 is connected to a negative potential of approximately 12 volts through a resistor R4 having a value of approximately 3K ohms. Transistor T3 is a PNP transistor.

During the negative excursion of the input voltage signal, the emitter of transistor T3 follows the signal; however, the emitter is slightly more positive than the input voltage signal by the amount of the base-emitter differential of transistor T3. At the time the signal starts its positive excursion, which is just slightly after the negative maximum level of the input voltage signal, the emitter potential of transistor T3 is momentarily held very close to the maximum negative value of the input voltage signal. The emitter of transistor T3 is less negative than its base at the time of occurrence of the maximum negative voltage of the input signal by an amount equal to the emitter-base drop of transistor T2 plus the forward drop of the diode DN. The capacitance of capacitor CN is large enough so that its voltage will remain essentially constant during the time the input signal reaches a maximum negative level and starts its positive excursion, to enable the input voltage signal to back bias the transistor T3. This results in the cutoff of conduction of transistor T3 to produce the sharp negative transition of the voltage at the collector of transistor T3. This sharp negative transition also appears at the output terminal 15 to provide an indication with a high degree of accuracy of the time at which a negative maximum level of the input voltage signal has occurred.

Figure 2:
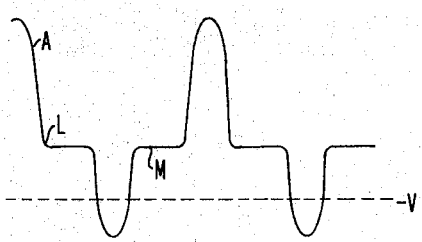
FIG. 2 is a diagram showing a curve A illustrating an electrical voltage signal and a curve B illustrating the time at which a negative maximum level of that voltage signal occurs.

Since the capacitor CN is not being charged through transistor T3, there is no change in the current conducted by transistor T3 at points L and M, curve A, FIG. 2, where the voltage signal levels out. Hence, transistor T3 would not provide an indication of detecting a peak at leveling-out points L and M. Transistor T3 cuts off or stops conducting when its base becomes more positive than its emitter and this occurs just after the voltage signal reaches a negative maximum and starts its positive excursion.

As previously stated, the output signal from transistor T3 appears at the terminal 15 and this output signal is shown as curve B in FIG. 2. As it will be seen shortly, transistor T3 does not begin to conduct until the negative excursion of the input voltage signal A exceeds a pre-determined negative voltage level. Once this pre-determined negative voltage level is reached, transistor T3 goes into full conduction and remains in such a state until cutoff. Hence, the output signal taken from transistor T3 as represented by curve B, FIG. 2, appears as a square signal with the cutoff edge well defined. The reason for not permitting transistor T3 to conduct until the input signal has a negative excursion exceeding a pre-determined negative voltage level, is to be able to distinguish between the desired peak of the input signal and those smaller peaks of the input signal which represent background noise.

In order to provide amplitude discrimination or noise rejection, a PNP transistor T4 has its emitter commonly connected to the emitter of transistor T3, its base connected to a terminal 20 for receiving a negative potential —V and its collector connected to a negative potential of approximately 12 volts through a resistor R5 having a value of approximately 500 ohms. With the emitters of transistors T3 and T4 commonly connected, an emitter follower "negative OR" circuit is formed. By this arrangement, when a voltage signal having an amplitude more positive than the —V voltage is applied to the base of transistor T4, the transistor T3 will be held in a non-conductive state. When the input voltage signal becomes more negative than the —V potential, transistor T3 will conduct and a sharp positive change in potential will appear at the collector of transistor T3 and consequently, at the output terminal 15. Transistor T3 then remains conductive until just after a negative maximum level of the input voltage signal is reached. When this occurs, transistor T3 cuts off to provide an indication of reaching a negative maximum level in the voltage signal. Hence, while it is possible for the input voltage signal to have negative peaks which are less than the —V voltage, these negative peaks will not be detected as maximums because they will not affect the operation of transistor T3.

In view of the fact that the voltage on capacitor CN is caused to follow the input voltage signal with a slight lag due to the emitter-base drop of transistor T1, the emitter of transistor T3 recovers through resistor R3 so that the next negative or maximum peak of the input voltage signal can be detected irrespective of its amplitude or time of occurrence. Capacitor CN recovers through the base-emitter junction of transistor T1. Thus the emitter of transistor T3 is allowed to follow the input signal as it begins its positive excursion by virtue of the conduction of diode DN. The diode DN, it will be remembered, insures that the charging of capacitor CN is through transistor T1 and not T3. The amount of conduction of current by transistor T3, therefore, is determined by the 9K ohm emitter resistor R3 and not by the rate of charging of capacitor CN.

Figure 4:
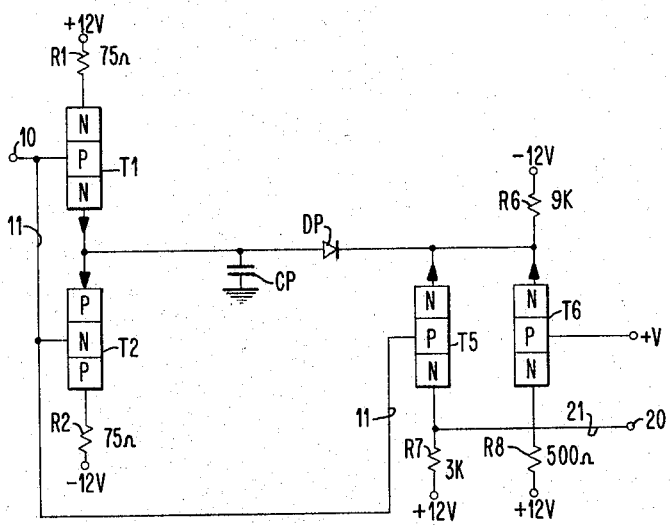
FIG. 4 is a schematic circuit diagram of the invention embodied to detect the time at which a positive maximum of an electrical voltage signal occurs.

The invention can also be embodied to detect positive peaks of the input voltage signal as well as negative peaks. In FIG. 4, a circuit is disclosed for detecting positive peaks of a voltage signal. The circuit of FIG. 4 is very similar to the circuit in FIG. 1 except that transistor T3 is replaced by an NPN transistor T5, transistor T4 is replaced by an NPN transistor T6, capacitor CN is replaced by a capacitor CP of substantially the same capacitance, and diode DN is replaced by a diode DP. A 9K ohm resistor R6 is connected in the emitter circuit of transistors T5 and T6 to a minus voltage of approximately 12 volts and 3K and 500 ohm resistors R7 and R8 are connected in the collector circuits of transistors T5 and T6 to a positive voltage of approximately 12 volts respectively. Diode DP is connected in the circuit so that its anode is connected to the emitters of transistors T1 and T2 and the cathode is connected to the emitters of transistors T5 and T6. The base of transistor T6 is connected to a positive potential +V. The output of the circuit is taken from the collector of transistor T5.

The circuit for charging and discharging the capacitor CP is the same as that for capacitor CN of FIG. 1. Hence, when there is a positive excursion of a voltage signal applied to input terminal 10, transistor T1 conducts so as to begin to charge capacitor CP. During this time, transistor T2 is cut off and transistor T5 does not conduct until the positive excursion of the input voltage signal rises above the +V potential applied to the base of transistor T6.

Similar to the circuit of FIG. 1, the conduction of transistor T5 does not indicate a peak point of the input signal. Rather, it is the subsequent cutoff of transistor T5 after the conduction thereof, which indicates that a peak has been reached by the input signal. Transistor T5 cuts off just after the signal reaches the maximum positive level and begins its negative excursion. This action takes place because the base of transistor T5 becomes more negative than the emitter and this causes transistor T5 to cut off. The cutoff of transistor T5 provides an indication at output terminal 20 connected to the collector of transistor T5 by a conductor 21 that a positive peak has occurred and that this positive peak is greater than the +V voltage applied to the base of transistor T6.

Figure 5:
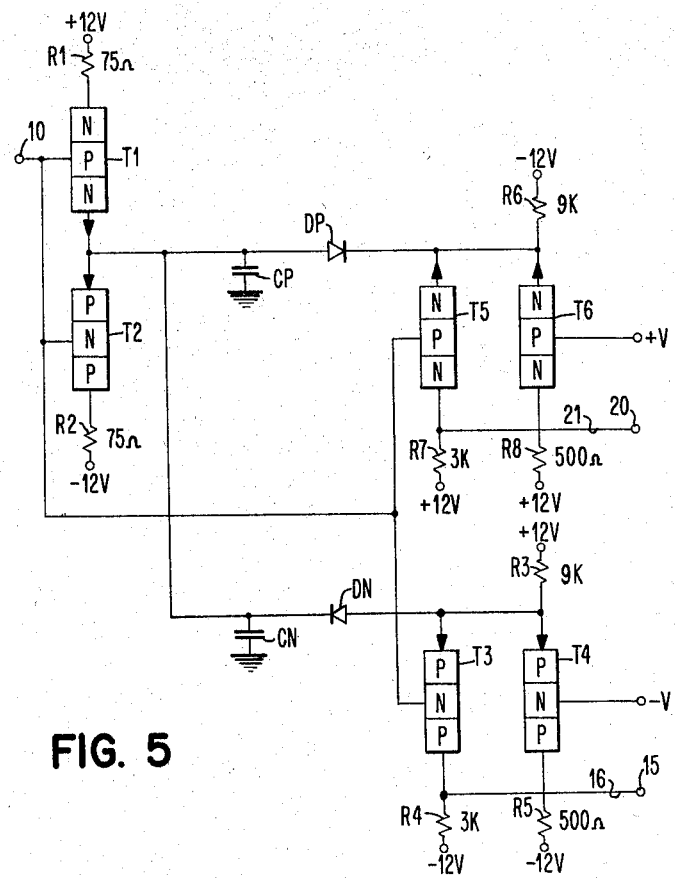
FIG. 5 is a schematic circuit diagram of the invention embodied to detect the time at which either a positive or negative maximum level of an electrical voltage signal occurs.

The circuit in FIG. 5 provides for both the detection of positive and negative peaks of a voltage signal. An indication that a positive peak has occurred will appear on output terminal 20 and an indication that a negative peak has occurred will appear at output terminal 15. The input terminal 10 is connected to the bases of transistors T1, T2, T3 and T5. The emitters of transistors T1 and T2 are commonly connected to capacitor CP and CN which are connected in parallel with each other. The remainder of the circuit in FIG. 5, omitting the portions just described, is essentially the circuits of FIG. 1 and FIG. 4 connected in parallel with each other.

A voltage signal applied to terminal 10 in FIG. 5 will cause the transistor T1 to conduct during the positive excursion of the signal. Conduction of transistor T1 charges capacitors CP and CN. Transistors T2, T3 and T5 will not be conducting at this time. When the input signal rises above the +V voltage, transistor T5 goes into conduction. Just after the input voltage signal reaches a positive maximum level and begins its negative excursion, transistor T5 cuts off. The cutoff of transistor T5 will result in a sharp voltage transition at its collector to provide an indication at output terminal 20 that a positive maximum voltage level has been reached by the input voltage signal.

As the input voltage signal continues the excursion in the negative direction, transistor T1 cuts off and transistor T2 goes into conduction. Capacitors CP and CN start to discharge. When the input voltage signal goes more negative than the —V voltage applied to the base of transistor T4, transistor T3 goes into conduction. Transistor T3 remains in the conductive state until just after the input voltage signal has reached the negative maximum voltage level and starts its positive excursion. At that time, transistor T3 cuts off and there is a sharp voltage transition at its collector. This transition provides an indication at output terminal 15 that a negative maximum voltage level has been reached by the input voltage signal.

From the foregoing, it is seen that the invention is able to detect positive and negative voltage peaks of a voltage signal. Further, it is seen that this is accomplished without detecting leveling out portions of the voltage signal as peaks. It is also seen that the invention is able to detect these negative and positive peaks without detecting background noise as peaks.

While the invention has been particularly shown and described with reference to (a) preferred embodiments thereof, it will be understood by those skilled in the art that various changes in form and details may be made therein without departing from the spirit and scope of the invention.

What is claimed is:

1. Apparatus for indicating the occurrence of a peak level of a voltage signal comprising:
    a pair of current conducting devices having inputs commonly connected for receiving said voltage signal;
    a capacitor commonly connected to the outputs of said current conducting devices whereby one current conducting device charges said capacitor as said voltage signal has a positive excursion and the other current conducting device discharges said capacitor during the negative excursion of said voltage signal;
    a peak indicating current conducting device having an input connected to receive said voltage signal and an output for indicating the time the peak level of said voltage signal occurs, said peak indicating current conducting device provides an indication of a voltage peak when it switches from a state of conduction to a non-conducting state; and
    a unidirectional current conducting device connected between said capacitor and said peak indicating current device to prevent said peak indicating current conducting device from charging said capacitor so that the current conducted by said peak indicating current is independent of the state of said capacitor and to permit the capacitor to facilitate turn off of said peak indicating current conducting device just after said voltage signal reaches a peak.

2. The apparatus of claim 1 wherein said pair of current conducting devices are NPN and PNP transistor respectively, and said peak indicating current conducting device is a PNP transistor.

3. The apparatus of claim 1 wherein said pair of current conducting devices are NPN and PNP transistors respectively and said peak indicating current conducting device is a NPN transistor.

4. The apparatus of claim 1 wherein said unidirectional current conducting device is a diode.

5. The apparatus of claim 1 further comprising means for biasing said peak indicating current conducting device so that the same will not go into conduction until said voltage signal exceeds a pre-determined voltage level.

6. Apparatus for indicating the occurrence of a peak level of a voltage signal comprising a first NPN transistor and a first PNP transistor connected in a complementary emitter follower configuration; a capacitor connected to the emitters of said transistors so as to be charged and discharged by said transistors; a second PNP transistor; a diode connected between said capacitor and the emitter of said second PNP transistor so as to prevent the same from charging said capacitor and to permit the capacitor to facilitate turn off thereof just after said voltage signal reaches a peak; and an input terminal for receiving said voltage signal connected to the base connections of each of the transistors whereby when said voltage signal reaches a maximum negative voltage level and starts its positive excursion, the conduction of said second PNP transistor is cut off to provide an indication that said maximum negative voltage level has been reached.

7. The apparatus of claim 6 further comprising a third PNP transistor having its emitter commonly connected with the emitter of said second PNP transistor and a terminal connected to its base connection for receiving a pre-determined negative voltage so as to prevent second PNP said transistor from conducting until the input voltage signal exceeds a pre-determined maximum level.

8. Apparatus for indicating the occurrence of a peak level of a voltage signal comprising a first NPN transistor and a first PNP transistor connected in a complementary emitter follower configuration; a capacitor connected to the emitters of said transistors so as to be charged and discharged thereby; a second NPN transistor; a diode connected between said capacitor and the emitter of said second NPN transistor so as to prevent the capacitor from being charged through said second NPN transistor and to permit the capacitor to facilitate turn off of said second NPN transistor just after the voltage signal reaches a peak; and an input terminal for receiving said voltage signal connected to the base connections of each of the said transistors whereby when the input voltage signal reaches a positive maximum voltage level and starts its negative excursion said second NPN transistor cuts off so as to provide an indication that the input voltage signal has reached a maximum positive voltage level.

9. The apparatus of claim 8 further comprising third NPN transistor having its emitter connected to the emitter of said second NPN transistor and a terminal connected to the base connection of said third NPN transistor for receiving a pre-determined positive voltage whereby said second NPN transistor will not conduct until the input voltage signal exceeds said pre-determined positive voltage.

10. Apparatus for indicating the occurrence of negative and positive peak levels of a voltage signal comprising an NPN and PNP transistors connected in a complementary emitter follower configuration; a pair of capacitors connected in parallel with each other and to the emitters of said transistors connected in the complementary emitter follower configuration; first and second NPN transistors having their emitters commonly connected to form an emitter follower positive OR circuit; a diode connected between said capacitors and the emitters of said first and second NPN transistors so as to prevent said first and second NPN transistors from charging said capacitors; first and second PNP transistors having their emitters commonly connected to form an emitter follower negative OR circuit; a diode connected between the emitters of said first and second PNP transistors and said capacitors so as to prevent said first and second PNP transistors from charging said capacitors; an input terminal connected to the base of said second NPN transistor for receiving a pre-determined positive voltage level; an input terminal connected to the base of said second PNP transistor for receiving a pre-determined negative voltage; and an input terminal connected to the bases of said transistors connected in a complementary emitter follower configuration and the bases of said first NPN transistor and said first PNP transistor whereby said first NPN transistor goes into a state of conduction when said input voltage signal exceeds the positive voltage applied to the base of said second NPN transistor and cuts off when said input voltage signal reaches a maximum positive voltage level and starts its negative excursion and whereby said first PNP transistor conducts when said input voltage signal becomes more negative than the negative voltage applied to the base of said second PNP transistor and said first PNP transistor cuts off when said input voltage signal reaches a maximum voltage level and starts its positive excursion.

11. Apparatus for indicating the occurrence of a negative peak level of an input voltage signal comprising: an NPN and PNP transistor connected in a complementary emitter follower configuration; a capacitor connected to the emitters of said NPN and PNP transistors connected in a complementary emitter follower configuration so as to be charged and discharged by said transistors; first and second PNP transistors having their emitters commonly connected to form an emitter follower negative OR circuit; a diode connected to the emitters of said first and second PNP transistors and to said capacitor so as to prevent said first and second PNP transistors from charging said capacitor; an input terminal connected to the base of said second PNP transistor for receiving a pre-determined negative voltage; an output terminal connected to the collector of said first PNP transistor and an input terminal connected to the bases of said transistors connected in a complementary emitter follower configuration and said first PNP transistor whereby said first PNP transistor goes into conduction when said input voltage signal exceeds the negative voltage applied to the base of said second PNP transistor and cuts off when said input voltage signal reaches a negative maximum voltage level and starts its positive excursion.

12. Apparatus for indicating the occurrence of a positive peak level of an input voltage signal comprising: a NPN and PNP transistors connected in a complementary emitter follower configuration; a capacitor commonly connected to the emitters of said transistors connected in a complementary emitter follower configuration; first and second NPN transistors having their emitters commonly connected to form an emitter follower positive OR circuit; a diode connected to the emitters of said first and second NPN transistors and to said capacitor so as to prevent said first and second NPN transistors from charging said capacitor; an input terminal connected to the base of said second NPN transistor for receiving a pre-determined positive voltage; an output terminal connected to the collector of said first NPN transistor; and an input terminal connected to the bases of said transistors connected in the complementary emitter follower configuration and to the base of said first NPN transistor whereby said first NPN transistor goes into conduction when said input voltage signal exceeds said positive pre-determined voltage applied to the base of said second NPN transistor and cuts off to provide an indication of a positive peak when said input voltage signal reaches a maximum positive voltage level and starts its negative excursion.

References Cited by the Examiner

UNITED STATES PATENTS

| | | | |
|---|---|---|---|
| 3,176,148 | 3/1965 | Lampke | 307—88.5 |
| 3,197,655 | 7/1965 | Wiseman | 307—88.5 |

ARTHUR GAUSS, *Primary Examiner.*

J. JORDAN, *Examiner.*